US 6,673,429 B1

(12) United States Patent
Ma et al.

(10) Patent No.: US 6,673,429 B1
(45) Date of Patent: Jan. 6, 2004

(54) MAGNETIC RECORDING MEDIA WITH A MULTIPLE-LAYER LUBRICANT

(75) Inventors: Xiaoding Ma, Fremont, CA (US); Michael Stirniman, Fremont, CA (US); Huan Tang, Los Altos, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 17 days.

(21) Appl. No.: 09/846,274

(22) Filed: May 2, 2001

Related U.S. Application Data
(60) Provisional application No. 60/221,457, filed on Jul. 25, 2000.

(51) Int. Cl.[7] .............................................. G11B 5/725
(52) U.S. Cl. ....................... 428/216; 428/408; 428/421; 428/422; 428/694 TF
(58) Field of Search ................. 428/216, 408, 428/421, 422, 694 TF, 900

(56) References Cited

U.S. PATENT DOCUMENTS

| | | | |
|---|---|---|---|
| 4,188,434 A | 2/1980 | Loran | |
| 4,404,247 A | 9/1983 | Dominguez-Burguette et al. | |
| 4,526,833 A | 7/1985 | Burguette et al. | |
| 4,529,659 A | 7/1985 | Hoshino et al. | |
| 4,552,799 A | 11/1985 | Ryoke et al. | |
| 4,601,950 A | 7/1986 | Iida et al. | |
| 4,664,963 A | 5/1987 | Sakai et al. | |
| 4,693,927 A | 9/1987 | Nishikawa et al. | |
| 4,786,544 A | 11/1988 | Saito | |
| 4,839,244 A | 6/1989 | Tsukamoto | |
| 4,849,305 A * | 7/1989 | Yanagisawa | 428/695 |
| 5,049,410 A | 9/1991 | Johary et al. | |
| 5,128,216 A * | 7/1992 | Ng | 428/695 |
| 5,137,784 A | 8/1992 | Suzuki et al. | |
| 5,178,954 A | 1/1993 | Norman et al. | |
| 5,331,487 A | 7/1994 | Gregory et al. | |
| 5,489,480 A | 2/1996 | Usuki et al. | |

(List continued on next page.)

FOREIGN PATENT DOCUMENTS

| | | |
|---|---|---|
| JP | 63102038 | 5/1988 |
| JP | 63225918 | 9/1988 |
| JP | 63237216 | 10/1988 |
| JP | 3134818 | 6/1991 |
| JP | 8319491 | 12/1996 |
| JP | 10251676 | 9/1998 |

OTHER PUBLICATIONS

G. Barth et al., "Characterizing the Surface Chemistry of Magnetic Disk Media through Surface Derivatization", Solid State Technology, p. 119–121, Jan. 1989.

M. Yanagisawa, "Adsorption of perfluoro–polyethers on carbon surfaces", ASME/STLE Tribology Conference, p. 25–32, Oct. 16–20, 1994.

B. DeKoven et al., Chemistry/orientation of lubricants on hard disk magnetic media substrates ($CH_x$ and $CN_x$) using near edge x-ray absorption fine structure (NEXAFS), (abstract), MRS Spring 98 Meeting, Symposium L, Materials for High–density Magnetic Recording, Apr. 12–16, 1998.

"Magnetic Materials", Annual Report, Ceramics Division, NIST, p. 1,6, Jul. 21, 1999.

N. Shukla et al., The interaction of $CF_3CH_2OH$ and $(CF_3CF_2)_2O$ with amorphous carbon films, *Langmuir* 2000, 16, 6562–6568, May 15, 2000.

*Primary Examiner*—Stevan A. Resan
(74) *Attorney, Agent, or Firm*—Morrison & Foerster LLP

(57) ABSTRACT

A magnetic recording medium with a dual-layer lubricant for better and faster mobility of a lubricant to ensure rapid healing of areas of the medium that have been depleted of the lubricant is disclosed.

20 Claims, 6 Drawing Sheets

U.S. PATENT DOCUMENTS

| | | | |
|---|---|---|---|
| 5,536,577 A | * 7/1996 | Murayama et al. | 428/408 |
| 5,587,217 A | * 12/1996 | Chao et al. | 428/65.4 |
| 5,618,639 A | * 4/1997 | Ohno et al. | 428/694 T |
| 5,677,051 A | 10/1997 | Ueda et al. | |
| 5,718,942 A | 2/1998 | Vurens et al. | |
| 5,820,964 A | 10/1998 | Nakakawaji et al. | |
| 5,858,536 A | * 1/1999 | Yanagisawa | 428/408 |
| 5,869,186 A | 2/1999 | Usuki et al. | |
| 6,001,446 A | 12/1999 | Nakada et al. | |
| 6,001,479 A | 12/1999 | Yokosawa et al. | |
| 6,099,762 A | 8/2000 | Lewis | |
| 6,099,896 A | 8/2000 | Stirniman | |
| 6,117,964 A | 9/2000 | Falcone | |

* cited by examiner

← 31 - vapor of lubricant mobility enhancer

← 33 - first layer

← 32 - disk (a) Step 1

← 34 - lubricant vapor

← 35 - second layer

← 33 - first layer

← 32 - disk (b) Step 2

(a) At the start of vapor deposition (b) After the start of vapor deposition

MAGNETIC RECORDING MEDIA WITH A MULTIPLE-LAYER LUBRICANT

RELATED APPLICATIONS

This application claims priority from Provisional Application Ser. No. 60/221,457 filed Jul. 25, 2000, entitled "Magnetic recording media with dual-layer lubricant," the entire disclosure of which is hereby incorporated herein by reference. This application is related to Ser. No. 09/708,504, filed Nov. 9, 2000, entitled "APPARATUS AND METHOD TO CONTROL THE MOLECULAR WEIGHT DISTRIBUTION OF A VAPOR," and Ser. No. 09/781,976 filed Feb. 14, 2001, entitled "ZONE BONDED LUBRICATION FOR HARD DISK RECORDING MEDIA," the entire disclosures of which are hereby incorporated herein by reference.

FIELD OF THE INVENTION

The present invention relates to recording media having two or more layers of lubricants, the first layer comprising a lubricant mobility enhancer and the second layer comprising a lubricant.

BACKGROUND

Most modern information storage systems depend on magnetic recording due to its reliability, low cost, and high storage capacity. The primary elements of a magnetic recording system are the recording medium, and the read/write head. Magnetic discs with magnetizable media are used for data storage in almost all computer systems. Current magnetic hard disc drives operate with the read-write heads only a few nanometers above the disc surface and at rather high speeds, typically a few meters per second. Because the read-write heads can contact the disc surface during operation, a thin layer of lubricant is coated on the disc surface to reduce wear and friction.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat 14, 14' to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

A conventional longitudinal recording disk medium is prepared by depositing multiple layers of metal films to make a composite film. In sequential order, the multiple layers typically comprise a non-magnetic substrate, one or more underlayers, a magnetic layer, and a protective carbon layer. Generally, a polycrystalline epitaxially grown cobalt-chromium (CoCr) magnetic layer is deposited on a chromium or chromium-alloy underlayer.

The seed layer, underlayer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

Lubricants conventionally employed in manufacturing magnetic recording media typically comprise mixtures of long chain polymers characterized by a wide distribution of molecular weights and include perfluoropolyethers, functionalized perfluoropolyethers, perfluoropolyalkylethers (PFPE), and functionalized PFPE. PFPE do not have a flashpoint and they can be vaporized and condensed without excessive thermal degradation and without forming solid breakdown products. The most widely used class of lubricants include perfluoropolyethers such as AM 2001®, Z-DOL®, Ausimont's Zdol or Krytox lubricants from DuPont.

Lubricants are either applied to the recording media by a vapor phase lubrication process or by a dip coating technique. When lubricants are applied using a dip coating technique, the lubricant is dissolved in a solvent at low concentration, and the media are dipped into the solution and withdrawn, or the solution is pumped over the media and then drained away. As the media are lifted or the solution drained a meniscus of solution is dragged along the disc's surface, and as the solvent evaporates a thin film of the nonvolatile lubricant is left on the disc. The amount of lubricant in the film is controlled through varying either the concentration of lubricant in the solution or the rate at which the media is lifted or the solution drained, or both.

Most disk drives produced currently operate in the Contact Start/Stop (CSS) mode. Since the recording head contacts with recording media during takeoff and landing, wear due to a large number of CSS cycles is a major cause of drive failure. Furthermore, as the head-media separation continues to decrease to achieve higher recording areal density, head-disc contacts during normal operation are expected to increase. Consequently, to ensure the reliability of a disk drive, it is essential that media have good wear durability, independent of start-stop mechanisms (CSS or load-unload). To ensure good wear durability, the desirable lubricant retention and replenishment abilities are critical. When a lubricant film is removed in an area due to head-disk contacts, lubricants in the vicinity should quickly flow into lubricant-depleted area to repair the damage before next contact occurs. Insufficient lubricant mobility will lead to accumulation of damage, and an eventual premature failure. Many studies shows that a moderate surface mobility of lubricant is required to achieve good wear durability. To enhance lubricant mobility, one may either reduce the molecular weight of a lubricant or select lubricants with weakly-interacting end-groups. However, such a choice often leads to unpleasant tradeoff such as fly-stiction and enhanced lubricant evaporative loss or "spin-off."

U.S. Pat. No. 6,099,762 (Lewis) generally discloses a dual-layer lubricant in the Background section of this patent. Lewis discloses a recording medium could have a carbon overcoat (col. 1, line 13), a lubricant, which can be a fluorocarbon or a phosphazene (col. 1, lines 17 and 18), and lubricants in separate sub-layers (col. 1, lines 25 and 26). However, there are many deficiencies in Lewis. First, the invention of Lewis is not related to a recording medium having two or more lubricant layers. Therefore, it does not disclose how one should make and use a recording medium having two or more lubricant layers. Second, Lewis treats phosphazene as a "lubricant," but does not recognize that phosphazene could also be a lubricant mobility enhancer when phosphazene is in the form of an adsorbed layer on the substrate and a lubricant layer lies above this adsorbed layer. Third, Lewis does not disclose the order in which the "lubricants," i.e., a fluorocarbon or phosphazene, should be deposited on a disk to form a dual-layer such that at least one constituent of a first layer would function as a mobility enhancer for the lubricant in a second layer.

A publication entitled, "MAGNETIC MATERIALS," published on Jul. 21, 1999, of which pages 1 and 6 are relied on, states that "interactions of perfluoroaklyl ethers and phosphazene on different carbon overcoated hard disks" were studied. "Results showed that Ar sputtered carbon overcoat interacted strongly with the phosphazene molecules [in the lubricant], while the hydrogenated carbon (the current hard disk coating) did not. This interaction explains why the phosphazene molecules tended to segregate from the perfluoroalkyl ethers on the hard disk and preferentially adsorbed onto the head surface, thereby reducing the catalytic decomposition of the alumina on the perfluoroaklyl ethers." Id. Sputtering carbon using Argon (Ar) plasma in a sputtering chamber with no hydrogen typically forms Ar sputtered carbon. On the other hand, hydrogenated carbon is typically formed if carbon sputtering is done in the presence of hydrogen.

JP 10251676 (Hirofumi) discloses a lubricant that is a mixture of perfluoropolyether and phosphazene compounds. The disadvantages of using such a mixture are the following. First, the phosphazene compound will not interact strongly with the hydrogenated carbon overcoat in accordance with the disclosure of the "MAGNETIC MATERIALS" publication. Second, even if the phosphazene compound tends to segregate on the carbon overcoat, a significant portion of the phosphazene compound will still be distributed in the bulk of the mixture, where it possibly provides no benefit for the purposes of enhancing the mobility of perfluoropolyether on the carbon overcoat. Third, based on applicants' experience, it is very hard to control the process of depositing a mixture of perfluoropolyether and phosphazene compounds on a carbon overcoat.

Therefore, an improved recording medium in which a lubricant mobility enhancer such as phosphazene interacts strongly with any overcoat, including hydrogenated carbon, and a process for manufacturing the recording medium is needed.

SUMMARY OF THE INVENTION

One embodiment of this invention is a device comprising a base layer, a first layer and a second layer, in this order, the base layer comprising binding sites on a surface of the base layer, the first layer comprising a lubricant mobility enhancer and the second layer comprising a lubricant, wherein the device is a component of a recording device and a majority of binding sites capable of pair-wise binding to molecules of the lubricant are bound to molecules of the lubricant mobility enhancer. The first layer could consist essentially of the molecules of the lubricant mobility enhancer. The thickness of the first layer could be about less than 2 nm. The thickness of the second layer could be about less than 3 nm. In one embodiment, the majority is about 50% or more. The molecules of the lubricant mobility enhancer could be adsorbed on the majority of binding sites. The majority of binding sites could only cover a portion of the surface of the base layer. The lubricant concentration could approximately be constant throughout each of the first and second layers. The binding sites could comprise high-energy binding sites. The binding sites could comprise low-energy binding sites.

Another embodiment is a method of manufacturing a device comprising depositing a base layer, depositing a first layer and depositing a second layer, in this order, the base layer comprising binding sites on a surface of the base layer, the first layer comprising a lubricant mobility enhancer and the second layer comprising a lubricant, wherein the device is a component of a recording device and a majority of binding sites capable of pair-wise binding to molecules of the lubricant are bound to molecules of the lubricant mobility enhancer.

Another embodiment is a device, comprising means for recording data and means for lubricating the means for recording data. The means for recording data could comprise a magnetic material, e.g., a magnetic layer, a polymeric and/or organic material, e.g., liquid crystal layer, that could be used for recording data. The means for lubricating the means for recording data is a system such as a single layer of a lubricant and a lubricant mobility enhancer or multiple layers of a lubricant and a lubricant mobility enhancer, wherein each layer of the multiple layers could have the lubricant and/or the lubricant mobility enhancer.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

DETAILED DESCRIPTION OF THE INVENTION

Figure 1:
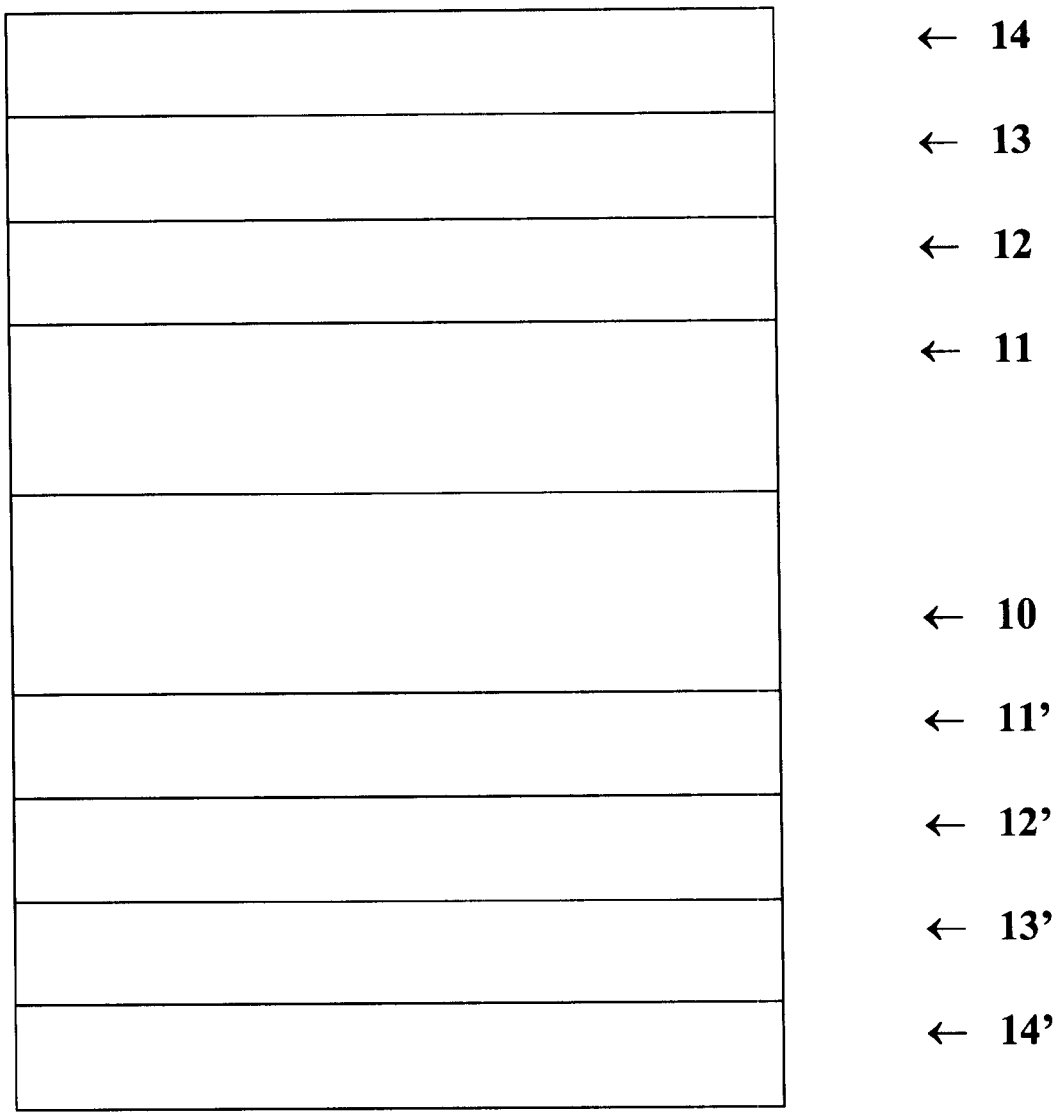
FIG. 1 schematically shows a conventional magnetic recording medium (Prior Art).
Figure 2:
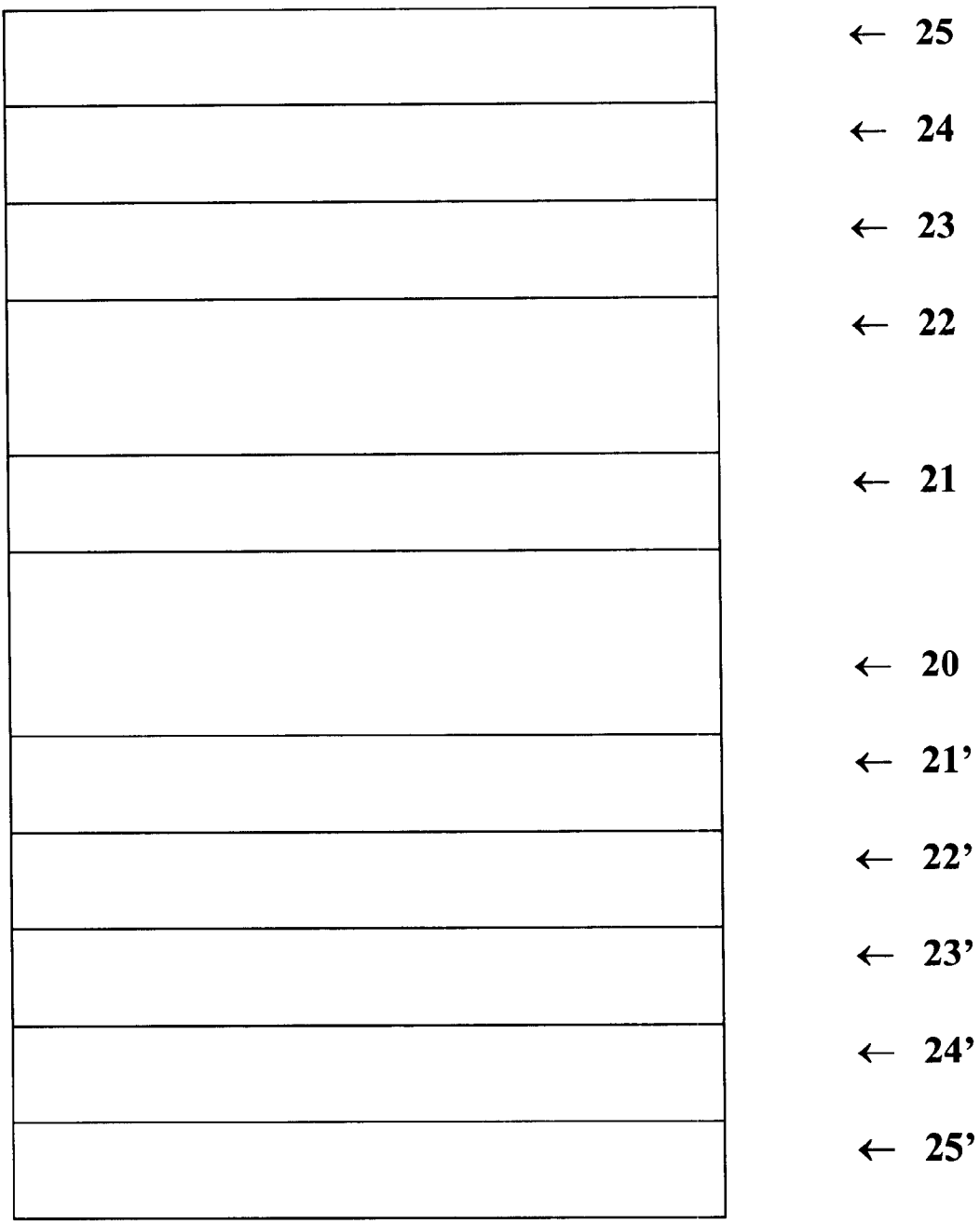
FIG. 2 is a graphical representation of a recording medium comprising a dual-layer lubricant.
Figure 3:
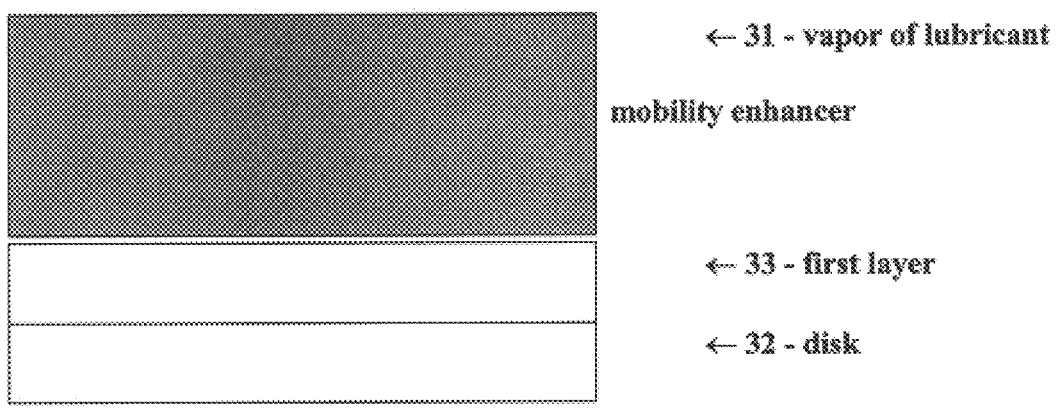
FIG. 3 shows one example of forming a dual-layer lubricant on a recording medium.
Figure 3:
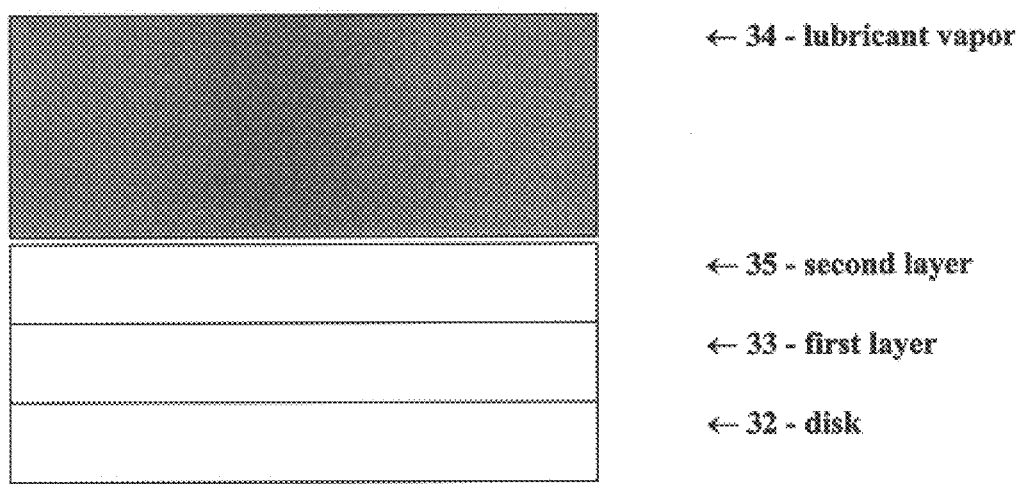

One embodiment of this invention is directed to a method of coating a substrate, particularly recording media (recording discs), with a dual-layer lubricant and a recording medium made by this method. An example of a magnetic recording medium having a dual-layer lubricant and the method of forming the dual-layer lubricant are shown in FIGS. 2 and 3, respectively. This method is further explained in Example 1 of the specification. Unlike the conventional disk of FIG. 1 in which there is a single lubricant topcoat 14, 14', the dual-layer lubricant has two lubricant layers 24, 24' and 25, 25' besides having substrate 20, underlayer 21, 21', magnetic layer 22, 22' and protective layer 23, 23'. In the preferred recording medium of this invention, first layer 24, 24' comprises a lubricant mobility enhancer, which is adsorbed on surfaces formed between layers 23 and 24 and layers 23' and 24'. The second layer 25, 25' comprises a lubricant.

Figure 4:
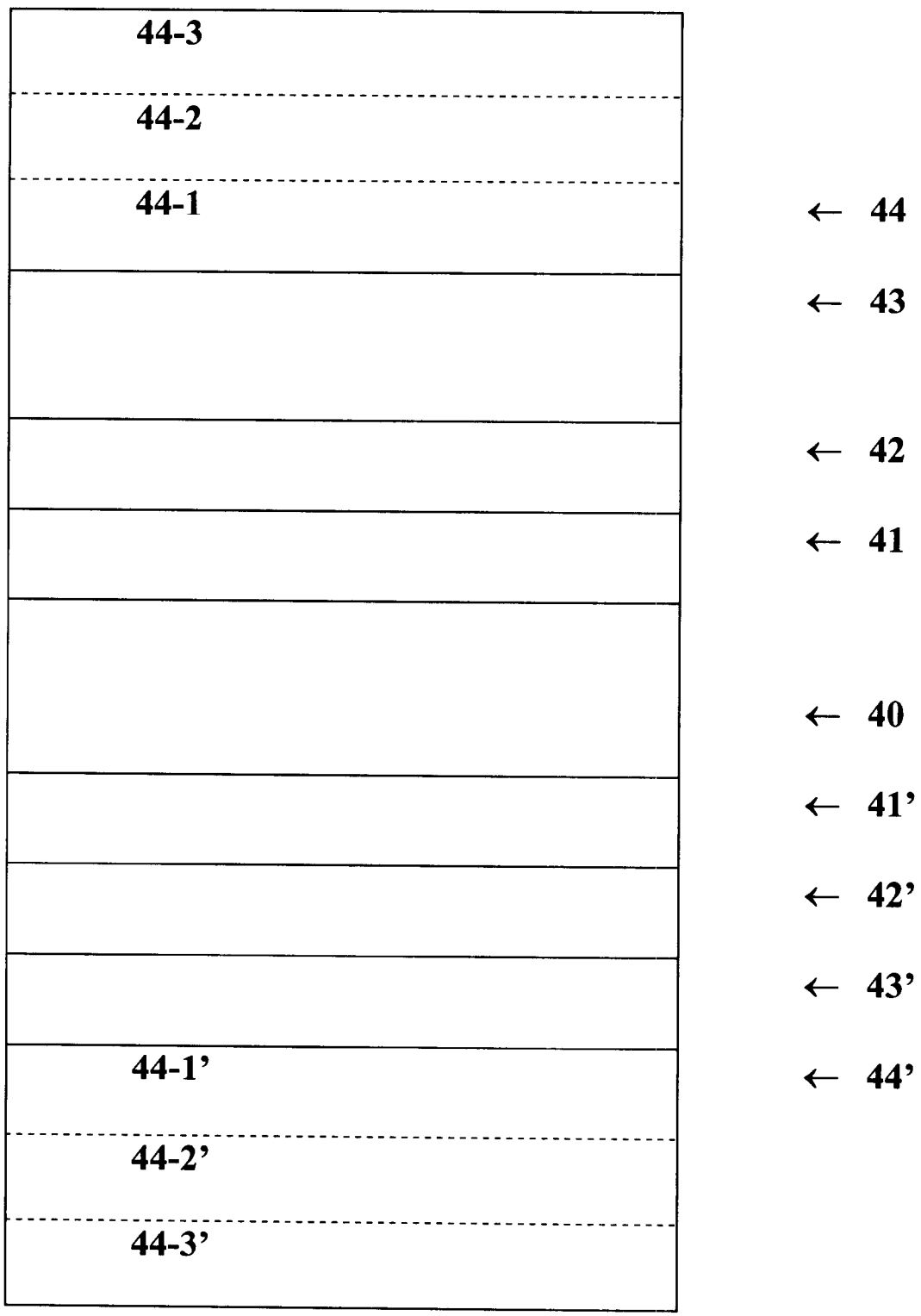
FIG. 4 is a graphical representation of a recording medium comprising a multiple-layer lubricant. The dotted lines in the lubricant layer respresent actual separation between distinctly separate multiple layers or separation between slices formed in a layer having a varying composition of a lubricant in the layer.

Another embodiment of this invention is a recording medium comprising a multiple-layer lubricant as shown in FIG. 4. Unlike the dual-layer lubricant system of FIG. 2, the multiple-layer lubricant system comprises lubricant layer 44, 44' comprising slices 44-1, 44-1' etc. in addition to substrate 40, underlayer 41, 41', magnetic layer 42, 42' and protective layer 43, 43'. The dotted lines in the lubricant layer 44, 44' could respresent actual surfaces between distinctly separate layers forming different phases like a surface between oil and water or a separation between slices formed in a "single-layer" lubricant having a varying composition of the lubricant in the layer 44, 44'. Each slice in the layer 44, 44' is an approximation of a thin layer in which the lubricant, e.g., Fomblin Z-Dol®, has approximately constant concentration throughout the thin slice even though the lubricant layer 44, 44' could have a varying composition from one surface to the other surface of the layer 44, 44'. A concentration is "approximately constant" when the ratio of minimum concentration to maximum concentration is 0.9 or more. Each slice could be of an atomic layer thickness or more, i.e., 0.1 Å or more. At least a portion of the molecules of the first slice 44-1, 44-1 ' in the layer 44, 44' on an adjacent layer located on the substrate 40, e.g., the layer 43, 43', are comprised of a lubricant mobility enhancer and they are adsorbed onto the surface of the adjacent layer.

Figure 5:
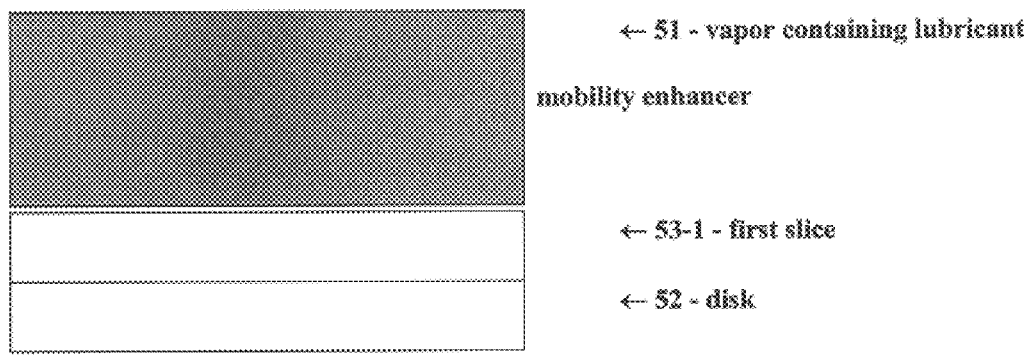
FIG. 5 shows one example of forming a multiple-layer lubricant on a recording medium. The multiple layers could be formed by depositing distinctly separate multiple layers or by depositing a layer having a graded composition in the lubricant of the layer.
Figure 5:
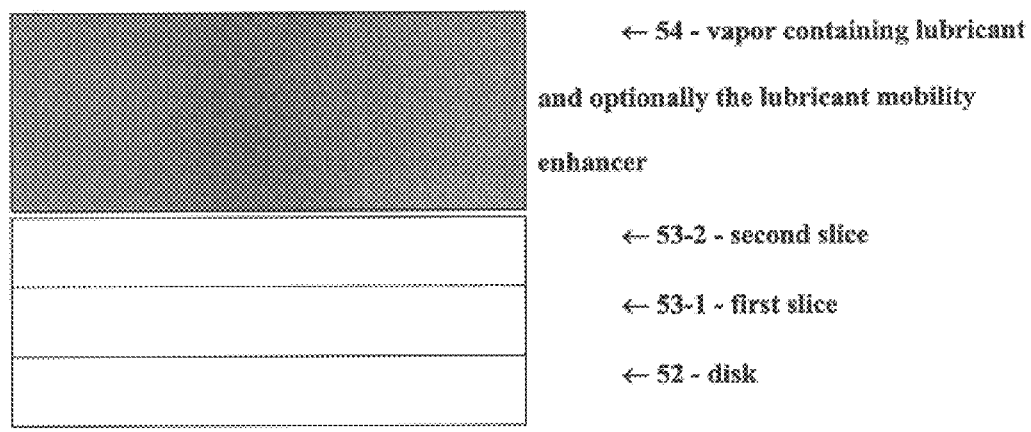

FIG. 5 shows one example of forming a multiple-layer lubricant on a recording medium. The multiple layers could be formed by depositing distinctly separate multiple layers or by depositing a "single-layer" having a graded composition in the lubricant in the layer as further described in Example 2 of the specification.

Hereinafter, the first layer 24, 24' of FIG. 2 and the first slice 44-1, 44-1' of the layer 44, 44' of FIG. 4 will be generically referred to as the "first layer" and the second layer 25, 25' of FIG. 2 and the slice above the first slice 44-1, 44-1' of the layer 44, 44' of FIG. 4 will be generically referred to as the "second layer." The term "adsorbed" is derived from the term "adsorption," which is defined in *McGraw-Hill Dictionary of Science and Technology Terms*, 31 (1984) as "[t]he surface retention of solid, liquid, or gas molecules, atoms, or ions by a solid or liquid, as opposed to absorbtion, the penetration of substances into the bulk of the solid or liquid."

Lubricants typically contain molecular weight components that range from several hundred Daltons to several thousand Daltons. The molecular components of low molecular weight will have a higher vapor pressure than the high molecular weight components.

The lubricants typically applied to recording media include polyfluoroether compositions that may be terminally functionalized with polar groups, such as hydroxyl, carboxy, or amino. The polar groups provide a means of better attaching or sticking the lubricant onto the surface of the recording media. These fluorinated oils are commercially available under such tradenames as Fomblin Zv, Fomblin Z-Dol®, Fomblin Ztetraol®, Fomblin Zdol-TX®, Fomblin Z15®, Fomblin Z25®, Fomblin Am2001®, Fomblin Z-DISOC® (Montedison); Demnum® (Daikin) and Krytox® (Dupont). The chemical structures of some of the Fomblin lubricants are shown below.

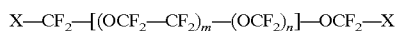

Fomblin Z: Non-reactive end groups

Fomblin Zdol: Reactive end groups

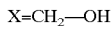

Fomblin AM2001: Reactive end groups

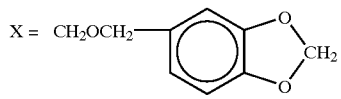

Fomblin Ztetraol: Reactive end groups

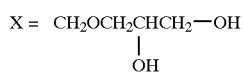

In this invention, the surface mobility of a lubricant is strongly influenced by the state of the surface that the lubricant is covering, which is generically referred to in this application as the "base layer." For an amorphous carbon base layer, which could also function as a protective overcoat for media, the surface contains binding sites that interact with lubricant molecules. Due to the amorphous nature of the surface, these surface sites have different strengths in their binding energy with a lubricant. In many situations, the protective layer is the base layer, but this is not always necessarily the case.

The high-energy sites tend to bond the molecules of a material such as a lubricant more strongly and, hence, reduce their mobility. The interactions between the high-energy surface sites and the molecules of a material are usually pair-wise, namely, once a site is occupied by one lubricant molecule, this site is no longer capable of binding another lubricant molecule.

Furthermore, the high-energy sites only cover a fraction of the surface, and one may use a fraction of a monolayer of a material to completely occupy all the high-energy surface sites. This property of surface site saturation could be utilized for lubricant mobility enhancement. A "lubricant mobility enhancer" is a material that bonds more strongly to a surface site than a lubricant compatible with the lubricant mobility enhancer. The term "compatible" means that the lubricant is a solvent for the lubricant mobility enhancer or that the lubricant could be coated over a film of the lubricant mobility enhancer.

As explained above, the high-energy binding sites on the surface of the base could only cover a fraction of the surface and use only a fraction of the total amount of a lubricant mobility enhancer that is capable of being adsorbed on the surface. In this situation, in some embodiments, it is possible that the adsorption ratio of the lubricant mobility enhancer is less than 1. The term "adsorption ratio" is defined as the ratio of the amount of a lubricant mobility enhancer adsorbed on a unit surface of a base layer to the maximum amount of the lubricant mobility enhancer that could be adsorbed on the unit surface of the base layer.

It is preferred that a lubricant mobility enhancer should have a low adsorption ratio, preferably, less than 0.1, more preferably less than 0.05, most preferably less than 0.001, while at the same time the lubricant mobility enhancer is capable of saturating the high-energy binding sites on the surface of the base layer.

One embodiment of this invention pertains to a magnetic recording media with dual-layer lubricant. The first layer is a sub-monolayer of a lubricant mobility enhancer such as phosphazene, or phosfarol, or any other lubricants that interact strongly with a carbon surface. "Strong interaction" means that the interaction between the lubricant mobility enhancer and the binding sites on the surface of a base layer is pair-wise. "Weak interaction" means that the interaction between a material and the binding sites on the surface of a base layer is not pair-wise.

The purpose of this sub-monolayer is to lower the surface energy by blocking the high binding energy sites. This layer can either be deposited by an in-situ vapor deposition process, or by dip-lube plus a post lube bonding-treatment. On top of this first layer, a second layer of a regular lubricant such as Zdol or other functional and non-functional perfluoropolyethers, can be applied by either dipping or vapor deposition. Because of the first layer which blocks the high-energy surface sites, the surface mobility of the lubricant in this second layer is greatly enhanced. The enhanced surface mobility of lubricant will enable fast recovery (repair) of a worn spot in between contacts. Therefore, the magnetic recording media with the dual-layer lubricant could have better tribological performance and wear durability.

To provide the lubricant vapor to the recording disc the lubricant, preferably a perfluorinated polyether, is heated, and the lubricant vapor deposits on the surface of the disc in an enclosed environment. Temperatures will generally range from 150° C. to 250° C. to provide deposition times in reasonable accordance with the rest of the disc manufacturing process. The thickness of the first layer comprising a lubricant mobility enhancer, see layers 24, 24' of FIG. 2, is less than 2 nm, preferably, less than 1.5 nm, more preferably less than 1 nm, and most preferably less than 0.5 nm. The thickness of the second layer, i.e., lubricant layers 25, 25' of FIG. 2, should be at least 0.5 nm, preferably at least 1 nm, and more preferably at least 1.2 nm and will generally be below 3 nm, preferably in the range from 1 nm to 3 nm. Molecular weight components of particular interest range from 1 kD to 10 kD, preferably from 2 kD to 8 kD.

One way of describing a distribution of molecular components of a polymer, i.e., polydispersity, is to compare the weight average molecular weight defined as $$M_w = \Sigma m_i M_i / \Sigma m_i$$

where mi is the total mass of molecular component in the polymer having a molecular weight $M_i$, with the number average molecular weight defined as $$M_n = \Sigma N_i M_i / \Sigma N_i$$

where $N_i$ is the total number of each molecular component in the polymer having a molecular weight $M_i$. The weight average molecular weight ($M_w$) of a polymer will always be greater than the number average molecular weight ($M_n$), because the latter counts the contribution of molecules in each class $M_i$ and the former weighs their contribution in terms of their mass. Thus, those molecular components having a high molecular weight contribute more to the average when mass rather than number is used as the weighing factor.

For all polydisperse polymers the ratio $M_w/M_n$ is always greater than one, and the amount by which this ratio deviates from one is a measure of the polydispersity of the polymer. The larger the $M_w/M_n$ ratio, the greater the breadth of the molecular weight distribution of the polymer.

The molecular weight distribution of the vapor phase can be sampled by condensation of the vapor onto a suitable surface, followed by analysis of the condensate in a calibrated size exclusion chromatography system.

It is desirable that the fresh lubricant has a relatively narrow molecular weight distribution of molecular components. In practice, the narrower the distribution, the easier it will be to maintain a steady-state concentration of one or more components in the vapor. For example, if the highest and lowest molecular weight components in the polymer have very similar molecular weights, their vapor pressures will also be very similar. On the other hand, if the molecular weights (vapor pressures) are dramatically different, heating of the lubricant will require much greater temperature and process control for a steady state concentration to be maintained. The lubricant used in the invention should have a $M_w/M_n$ ratio between 1 and 1.6, preferably between 1 and 1.3, more preferably between 1 and 1.2.

The invention can be practiced with any commercial lubricant with a relatively large or small polydispersity, or with a lubricant that has been pre-fractionated to obtain a lubricant with a relatively small polydispersity. The preferred embodiment of the invention does not involve pre-fractionation of the lubricant. However, pre-fractionated lubricants may be used to provide relatively narrow molecular weight lubricant. If a pre-fractionated lubricant is used in the invention, the pre-fractionated lubricant can be obtained by distillation, chromatography, extraction, or other techniques that allow separation by molecular weight.

This invention could be practiced with any carbon overcoat underneath the first layer. The carbon overcoat could be Ar sputtered carbon, hydrogenated carbon, nitrogen containing carbon, fluorine containing carbon, Si-containing carbon and diamond-like carbon.

EXAMPLES

Many methods can be used to create dual-layer lubricants. The invention will be better understood with reference to the following examples, which are intended to illustrate specific embodiments within the overall scope of the invention as claimed. DC magnetron sputtering was used for making the disks of the examples.

Example 1

One example of the invention is shown schematically in FIG. 3. As shown in FIG. 3, the first step is vapor deposition on disk 32 using vapor 31 containing a lubricant mobility enhancer, i.e., phosphazene X1P, to form the first layer 33 of a thickness about 0.5 nm. The next step is vapor deposition on the disk 32 using vapor 34 containing a lubricant, e.g., Fomblin Z-Dole® to form the second layer 35.

Example 2

One example of the invention is shown schematically in FIG. 5. As shown in FIG. 5, vapor deposition on disk 52 is first started using vapor 51 that primarily contains a lubricant mobility enhancer, i.e., phosphazene X1P, to form the first slice 53-1 of a thickness about 0.5 nm. Subsequently, vapor deposition on the disk 52 is continued using vapor 54 that primarily contains a lubricant, e.g., Fomblin Z-Dol®, but could optionally contain a lubricant mobility enhancer, e.g., phosphazene X1P, to form the second slice 53-2. Additional slices such as 53-3 and so on (not shown in FIG. 5) could still further be formed with a different vapor composition of the material vapor deposited on the disk 52.

In other embodiments, the disk of FIGS. 3 and 5 could be dipped in a tank containing the lubricant mobility enhancer, e.g., phosphazene X1P, and/or the lubricant, i.e., Fomblin Z®, in a liquid form and withdrawn to form the first and second layers 33 and 35 of FIG. 3 or the first and second slices 53-1 and 53-2 of FIG. 5.

In yet another embodiment, an additional step would be to expose the disk to some form of radiation, such as UV, after deposition of the first layer, the second layer or both the first and second layers of the lubricant. The UV exposure could be of intensity about 20 mW/cm$^2$ under ambient condition for 1 minute.

In Examples 1 and 2, the discs could be contained in a deposition chamber held at a pressure sufficiently low so as to provide line of sight deposition of the lubricant vapor onto the disc surface. In this case a sufficiently low pressure would mean that the mean free path of the lubricant vapor is greater than the distance of the disc from the vapor source. For typical deposition geometries, a deposition chamber pressure to achieve reasonable mean free paths would be in the range of $10^{-5}$ to $10^{-8}$ mbar.

One example of the line of sight deposition of the lubricant vapor, includes the vapor deposition device described in U.S. Pat. No. 6,099,896, the entire disclosure of which is incorporated herein by reference. The vapor deposition device directs a lubricant vapor through one or more orifices to produce a virtual beam of lubricant vapor. The lubricant vapor is used to coat recording media in one or more select locations. The device can also be used to direct lubricant vapor to the recording media without passing the lubricant through an orifice.

In these embodiments, the disc surface is maintained at a sufficiently low temperature to allow condensation of the lubricant vapor. Alternatively, the disc may be maintained at a temperature to allow selective condensation of higher molecular weight components from the vapor phase.

Example 3

Figure 6:
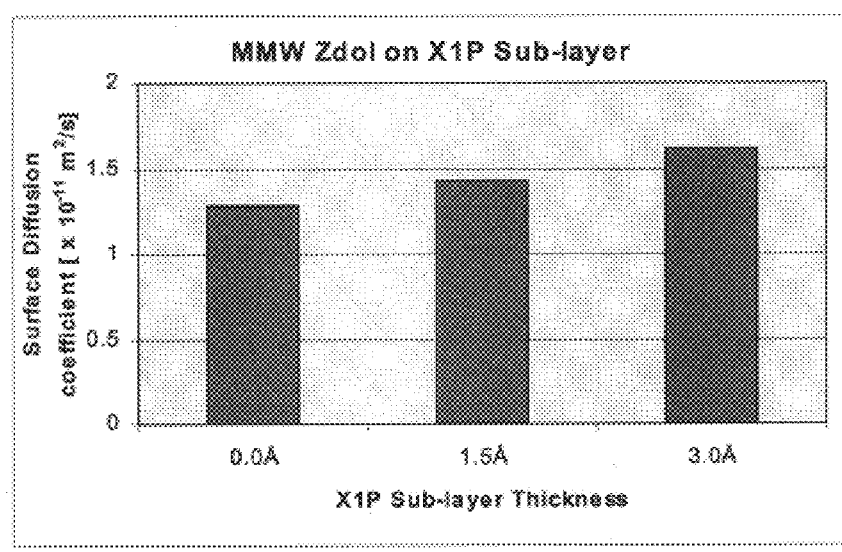
FIG. 6 shows the values of surface diffusion coefficient of MMW Zdol as a function of the phosphazene (X1P) sublayer thickness.

Three disks were made with a sub-layer of phosphazene X1P of thickness 0, 1.5 and 3.0 Å and a top-layer of Zdol lubricant of thickness 70 Å. The disk was made of an Al substrate. FIG. 6 shows the surface diffusion coefficient of Zdol lubricant as a function of the first layer thickness of X1P which was applied through vapor deposition. It was observed that the diffusion coefficient increases as the thickness of X1P sub-layer increases.

In short, based on these data, the preferred embodiments of this invention can consist of the following. The first layer is a sub-layer of Phosphazene X1P by vapor deposition. The thickness of this layer is between 0.01 and 0.5 nm (0.1 and 5 Å) as measured by FTIR calibrated using ESCA. The second layer is a layer of regular lubricant like Zdol or Ztetraol by dip or vapor deposition. The thickness is between 0.5 and 2 nm (5 and 20 Å). The enhanced surface mobility of the second layer lubricant is afforded by the presence of the first sub-layer of mobility enhancer. The media with such dual-layer lubricants have demonstrated better wear durability.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A device comprising a base layer, said base layer being a carbon overcoat, a first layer and a second layer, in this order, the base layer comprising binding sites on a surface of the base layer, the first layer comprising a lubricant mobility enhancer and the second layer comprising a lubricant, wherein the device is a component of a recording device and a majority of binding sites capable of pair-wise binding to molecules of the lubricant are bound to molecules of the lubricant mobility enhancer, wherein the first layer provides a surface mobility to the second layer that is higher than a surface mobility of the second layer without the first layer, and further wherein a formula of a molecule of the lubricant has a same group at both ends of the formula.

2. The device of claim 1, wherein the first layer consists essentially of the molecules of the lubricant mobility enhancer.

3. The device of claim 1, wherein the thickness of the first layer is less than 2 nm.

4. The device of claim 1, wherein the thickness of the second layer is less than 3 nm.

5. The device of claim 1, wherein said majority is 50% or more.

6. The device of claim 1, wherein the molecules of the lubricant mobility enhancer are adsorbed on said majority of binding sites.

7. The device of claim 1, wherein said majority of binding sites only cover a portion of the surface of the base layer.

8. The device of claim 1, wherein the first layer further comprises the lubricant and a lubricant concentration is approximately constant throughout each of the first and second layers.

9. The device of claim 1, wherein an adsorption ratio of the lubricant mobility enhancer is less than 1.

10. A method of manufacturing a device comprising depositing a base layer, said base layer being a carbon overcoat, depositing a first layer and depositing a second layer, in this order, the base layer comprising binding sites on a surface of the base layer, the first layer comprising a lubricant mobility enhancer and the second layer comprising a lubricant, wherein the device is a component of a recording device and a majority of binding sites capable of pair-wise binding to molecules of the lubricant are bound to molecules of the lubricant mobility enhancer, wherein the first layer provides a surface mobility to the second layer that is higher than a surface mobility of the second layer without the first layer, and further wherein a formula of a molecule of the lubricant has a same group at both ends of the formula.

11. The method of claim 10, wherein the first layer consists essentially of the molecules of the lubricant mobility enhancer.

12. The method of claim 10, wherein the thickness of the first layer is less than 2 nm.

13. The method of claim 10, wherein the thickness of the second layer is less than 3 nm.

14. The method of claim 10, wherein said majority is 50% or more.

15. The method of claim 10, wherein the molecules of the lubricant mobility enhancer are adsorbed on said majority of binding sites.

16. The method of claim 10, wherein said majority of binding sites only cover a portion of the surface of the base layer.

17. The method of claim 10, wherein the first layer further comprises the lubricant and a lubricant concentration is approximately constant throughout each of the first and second layers.

18. The method of claim 10, wherein an adsorption ratio of the lubricant mobility enhancer is less than 1.

19. A device comprising a base layer, said base layer being a carbon overcoat, a first layer and a second layer, in this order, the base layer comprising binding sites on a surface of the base layer, the first layer comprising a lubricant mobility enhancer and the second layer comprising a lubricant, wherein the device is a component of a recording device, wherein the first layer provides a surface mobility to the second layer that is higher than a surface mobility of the second layer without the first layer, and further wherein a formula of a molecule of the lubricant has a same group at both ends of the formula.

20. A method of manufacturing a device comprising depositing a base layer, said base layer being a carbon overcoat, depositing a first layer and depositing a second layer, in this order, the base layer comprising binding sites on a surface of the base layer, the first layer comprising a lubricant mobility enhancer and the second layer comprising a lubricant, wherein the device is a component of a recording device, wherein the first provides a surface mobility to the second layer that is higher than a surface mobility of the second layer without the first layer, and further wherein a formula of a molecule of the lubricant has a same group at both ends of the formula.

* * * * *